US012591989B2

(12) United States Patent
Ollila

(10) Patent No.: US 12,591,989 B2
(45) Date of Patent: Mar. 31, 2026

(54) METHOD FOR DEPTH ESTIMATION AND HEAD-MOUNTED DISPLAY

(71) Applicant: Varjo Technologies Oy, Helsinki (FI)

(72) Inventor: Mikko Ollila, Tampere (FI)

(73) Assignee: Varjo Technologies Oy, Helsinki (FI)

( * ) Notice: Subject to any disclaimer, the term of this patent is extended or adjusted under 35 U.S.C. 154(b) by 271 days.

(21) Appl. No.: 18/392,282

(22) Filed: Dec. 21, 2023

(65) Prior Publication Data

US 2025/0209653 A1    Jun. 26, 2025

(51) Int. Cl.
| | |
|---|---|
| *G06K 9/00* | (2022.01) |
| *G06T 7/593* | (2017.01) |
| *G06T 7/73* | (2017.01) |
| *G06T 7/90* | (2017.01) |

(52) U.S. Cl.
CPC ............... *G06T 7/593* (2017.01); *G06T 7/74* (2017.01); *G06T 7/90* (2017.01); *G06T 2207/10012* (2013.01); *G06T 2207/10024* (2013.01); *G06T 2207/20081* (2013.01); *G06T 2207/20084* (2013.01); *G06T 2207/20221* (2013.01)

(58) Field of Classification Search
CPC .. G06T 7/593; G06T 7/74; G06T 7/90; G06T 2207/10012; G06T 2207/10024; G06T 2207/20081; G06T 2207/20084; G06T 2207/20221; G06T 2207/10028; G06T 7/50; G06N 3/0464; G06N 3/045; G06N 3/08; G06N 3/0455; G06N 3/09; G06V 10/82
See application file for complete search history.

(56) References Cited

U.S. PATENT DOCUMENTS

| | | | |
|---|---|---|---|
| 2019/0289281 A1 | 9/2019 | Badrinarayanan et al. | |
| 2020/0273192 A1* | 8/2020 | Cheng ................... | G06V 10/454 |
| 2022/0026920 A1* | 1/2022 | Ebrahimi Afrouzi ........................ | |
| | | | G06N 3/0495 |
| 2024/0135559 A1* | 4/2024 | Dikov ....................... | G06T 7/73 |

(Continued)

OTHER PUBLICATIONS

Aydemir et al., "H-VLO: Hybrid LiDAR-Camera Fusion for Self-Supervised Odometry" 2022 IEEE/RSJ International Conference on Intelligent Robots and Systems (IROS), Oct. 23, 2022, DOI: 10.1109/IROS4761220229981111, 6 pages.

(Continued)

*Primary Examiner* — Gregory A Morse
*Assistant Examiner* — Owais I Memon
(74) *Attorney, Agent, or Firm* — Ziegler IP Law Group, LLC.

(57) ABSTRACT

Disclosed is a method for depth estimation including receiving first and second colour images and sparse depth map corresponding to first and second colour images; generating first and second depth prediction maps by providing first and second colour images and sparse depth map as input to neural network, wherein neural network has first branch for receiving first colour image and sparse depth map as input to generate first depth prediction map and second branch for receiving second colour image and sparse depth map as input to generate second depth prediction map, and wherein first and second branches of neural network share weights by inter-branch weight sharing mechanism; and fusing first and second depth prediction maps to generate dense depth map for depth estimation.

13 Claims, 5 Drawing Sheets

(56) References Cited

U.S. PATENT DOCUMENTS

| | | | |
|---|---|---|---|
| 2024/0273742 A1* | 8/2024 | Das | G06V 10/768 |
| 2024/0331176 A1* | 10/2024 | Ramachandran | G06T 7/50 |

OTHER PUBLICATIONS

European Patent Office, Extended European Search Report, Application No. 242151280, mailed Apr. 30, 2025, 9 pages.
Kao et al. "Integrating Low-Cost LiDAR and Stereo Camera for 3D Object Detection with Lidar-Stereo Fusion and Cost Volume Enhancement" Tencon 2022, 2022 IEEE Region10 Conference, Nov. 1, 2022, DOIL 10.1109/TENCON5569120229977732, 6 pages.

* cited by examiner

METHOD FOR DEPTH ESTIMATION AND HEAD-MOUNTED DISPLAY

TECHNICAL FIELD

The present disclosure relates to methods for depth estimation. The present disclosure also relates to head-mounted display devices.

BACKGROUND

Nowadays, with an increase in the number of images being captured every day, there is an increased demand for developments in image processing. Such a demand is quite high and critical in case of evolving technologies such as immersive extended-reality (XR) technologies which are being employed in various fields such as entertainment, real estate, training, medical imaging operations, simulators, navigation, and the like. Several advancements are being made to develop image generation technology. Moreover, depth maps are generated for the images to determine distance information about a given scene in a real-world environment. Herein, the depth information facilitates in understanding a three-dimensional (3D) structure and layout of the given scene and enables reconstruction of the real-world environment in 3D.

However, existing image generation technology has several limitations associated therewith. Conventionally, stereo disparity-based systems are used to provide depth information related to the given scene of the real-world environment. However, such stereo disparity-based systems can only produce dense depth maps when there are distinctive features and textures in the given scene of the real-world environment. Moreover, Light Detection and Ranging (LiDAR)-based systems are used to provide accurate depth information related to non-textured areas of the given scene of the real-world environment. However, depth maps produced using such depth information are sparse and fails on edges and produces noisy results on those edges. Furthermore, a combination of a single camera of the stereo disparity-based systems and the LiDAR-based systems, or conventional stereo disparity-based systems, are not able to produce depth maps that enables the reconstruction of the real-world environment in an accurate manner.

Therefore, in light of the foregoing discussion, there exists a need to overcome the aforementioned drawbacks.

SUMMARY

The aim of the present disclosure is to provide methods for depth estimation and head-mounted display devices, to facilitate accurate generation of dense depth maps that are information-rich and provides depth information related to textured surface and non-textured surfaces. The aim of the present disclosure is achieved by methods for depth estimation and head-mounted display devices as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

Figure 1:
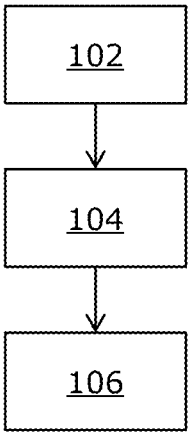
FIG. 1 illustrates are steps of a method for depth estimation, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, the present disclosure provides a method for depth estimation, the method comprising:

receiving first and second colour images and a sparse depth map corresponding to the first and second colour images;

generating first and second depth prediction maps by providing the first and second colour images and the sparse depth map as an input to a neural network, wherein the neural network comprises a first branch for receiving the first colour image and the sparse depth map as the input to generate the first depth prediction map and a second branch for receiving the second colour image and the sparse depth map as the input to generate the second depth prediction map, and wherein the first and second branches of the neural network share weights by an inter-branch weight sharing mechanism; and fusing the first and second depth prediction maps to generate a dense depth map for the depth estimation.

In a second aspect, the present disclosure provides a head-mounted display device comprising:

a stereo camera for capturing first and second colour images; and a processor operatively coupled to the stereo camera and the depth sensor, wherein the processor is configured to receive the first and second colour images and the sparse depth map;

generate a sparse depth map corresponding to the first and second colour images;

generate first and second depth prediction maps by providing the first and second colour images and the sparse depth map as an input to a neural network, wherein the neural network comprises a first branch for receiving the first colour image and the sparse depth map as the input to generate the first depth prediction map and a second branch for receiving the second colour image and the sparse depth map as the input to generate the second depth prediction map, and wherein the first and second branches of the neural network share weights by an inter-branch weight sharing mechanism; and fuse the first and second depth prediction maps to generate a dense depth map for the depth estimation.

The present disclosure provides the aforementioned first aspect and the aforementioned second aspect to generate high-quality and realistic images, by processing the first and second colour images and the sparse depth map corresponding to the first and second colour images to generate the dense depth map which is information-rich. This dense depth map is able to provide depth information related to textured surfaces and non-textured surfaces of the real-world environment, as the processor processes the first and second colour images and the sparse depth map corresponding to the first and second colour images. Herein, the first and second colour images and the sparse depth map are processed parallelly using the first and second branches of the neural network, respectively, which is time-effective. Since, the first and the second branches correspond to respective eyes of the user, the real-world environment can be reconstructed accurately as a resolution of the dense depth maps matches a resolution of the head-mounted display device, wherein the resolution of the head-mounted display device matches a resolution (i.e., 20/20 vision) of the user's eyes. Moreover, the first and second branches of the neural network share weights by the inter-branch weight sharing mechanism, thereby integrating information from different branches, which facilitates in generating first and second depth prediction maps which are detailed. The first and second depth prediction maps are then fused to integrate this information in the dense depth map, thereby making the dense depth map information-rich. Existing head-mounted display device comprises a stereo pair-forming Red-Green-Blue (RGB) video see-through (VST) cameras and at least one depth sensor, thereby requiring minimal hardware changes thus making it cost-effective. The aforementioned first aspect and the second aspect also reduces a processing time and processing resources of the processor. This potentially makes the aforementioned first and second aspects suitable for use with demanding applications (such as extended-reality applications). The method and the head-mounted display device are simple, robust, fast, reliable, and can be implemented with ease. 30 Throughout the present disclosure, the term "colour image" refers to a visual representation of a real-world environment. The visual representation encompasses colour information of a given colour image (namely, the first colour image and/or second colour image), and additionally optionally other attributes associated with the given colour image (for example, such as depth information, luminance information, transparency information (namely, alpha values), polarization information, and the like). Herein, the first colour image corresponds to any one of a first eye or a second eye of a user, and the second colour image corresponds to another one of a second eye or a first eye of the user. Herein, the first eye is any one of a left eye or a right eye of the user, and the second eye is another one of the right eye or the left eye of the user. Hence, the first and the second colour images are captured from slightly different perspectives.

Throughout the present disclosure, the term "sparse depth map" refers to a specialised data structure comprising information related to particular optical depths of particular objects or their portions within the real-world environment from a viewpoint. The sparse depth map provides discrete depth values for only particular points or areas of interest.

The first and second colour images along with the sparse depth map corresponding to the first and second colour images are captured using a stereo camera. Throughout the present disclosure, the term "stereo camera" refers to an equipment that is operable to detect and process signals, such as visible-light signals, received from a real-world environment, so as to capture the given colour image of the real-world environment. In this regard, the stereo camera is implemented as at least two visible light cameras arranged at a certain distance from each other to simulate human binocular vision. Thus, the at least one two visible light cameras capture the first and second colour images from slightly different perspectives. Such difference in perspective is used for computing depth information, wherein, the first and second colour images are analysed to determine pixel-level differences between corresponding points in the first and second colour images. The pixel-level differences are then triangulated with known camera parameters. Subsequently, using stereo vision algorithms, the sparse depth map is generated by selectively computing depth values for particular points in the first and second colour images. Such stereo vision algorithms are well-known in the art.

It will be appreciated that the stereo camera could be implemented as a combination of the visible light camera and a depth camera. Examples of the stereo camera may include, but are not limited to, a Red-Green-Blue-Depth (RGB) camera, a Red-Green-Blue-Alpha (RGB-A) camera, a monochrome camera. As an example, the stereo camera may be the RGB camera, and the first and second colour image may comprise RGB texture data.

Optionally, the first and second colour images are processed to generate a sparse depth map, particular pixels of the first and second colour images that represent a same three-dimensional (3D) point or a same 3D region in the real-world environment are matched. Then, binocular disparities between the matched pixels of the first and second colour images are determined. These binocular disparities are processed (for example, using a triangulation technique) to determine the optical depths of the real objects with respect to the stereo camera. Such optical depths of the real objects within the real-world environment are represented in the sparse depth map.

Optionally, the method further comprises generating the sparse depth map corresponding to the first and second colour images by using a depth sensor. Herein, the term "depth sensor" refers to a sensor that is operable to at least detect optical depths in the real-world environment so as to capture depth images of the real-world environment. A given depth image represents optical depth(s) of real object(s) present in the real-world environment. The given depth image may also represent a visual content of the real-world environment, in addition to the optical depth(s) of the real object(s). Optionally, the given depth image is a two-dimensional (2D) depth image or a three-dimensional (3D) depth image. The at least one depth sensor may be implemented as a light-based depth sensor, a cound-based depth sensor.

Optionally, the depth sensor is a part of a depth camera. The depth camera could be arranged on a head-mounted display (HMD) worn by the user on his/her head, or could be arranged anywhere in the real-world environment where the user is present, or could be arranged on a remote device present in the real-world environment. Examples of the depth camera may include, but are not limited to, Red-Green-Blue-Depth (RGB-D) camera, a ranging camera, a Light Detection and Ranging (LiDAR) camera, a flash LiDAR camera, a Time-of-Flight (ToF) camera, a Sound Navigation and Ranging (SONAR) camera, a laser rangefinder, a plenoptic camera, an infrared camera. In a second example, the depth camera may be the LiDAR camera, and the given depth image may comprise RGB-D texture data.

The first branch of the neural network corresponds to any one of the first eye or the second eye of the user, and the second branch of the neural network corresponds to another one of the second eye or the first eye. The neural network has a convolutional architecture (for example, such as an UNet architecture) that comprises layers of encoder and layers of decoder with symmetric skip connections. In the first branch and the second branch, the layers of encoder comprises one convolution layer and ten residual blocks (ResBlocks) in pairs of two residual blocks, and the layers of decoder comprises five ResBlocks and another convolution layer. The neural network extracts features (for example, such as depth-related information) from the first and second colour images and corresponding sparse depth map of the first and second colour images by employing image processing techniques, for example, RAFT algorithm. Such image processing techniques are well-known in the art. Optionally, the first branch of the neural network integrates the features from the first colour image and the sparse depth map, and the second branch of the neural network integrates the features from the second colour image and the sparse depth map. This integration allows the neural network to combine information from different modalities (i.e., colour and depth) to make detailed depth predictions.

Optionally, the neural network is trained using a supervised learning process, wherein reference colour images corresponding to each eye of the user and reference sparse depth map corresponding to the reference colour images is provided as input to the neural network. Herein, the reference sparse depth map are ground truth depth maps. Subsequently, the neural network processes the input and generates reference depth prediction maps. The neural network employs a loss function to compare the reference depth prediction maps with the ground truth depth maps to determine a loss (namely, an error) between the reference depth prediction maps with the ground truth depth maps. This loss is used to subsequently update the neural network to generate accurate depth prediction maps.

Throughout the present disclosure, the term "depth prediction map" refers to a representation of predicted depth information for particular pixels in the first and second colour images. Herein, a particular pixel in a given depth prediction map (namely, a first depth map and/or a second depth map) corresponds to a specific location in a given colour image (namely, the first colour image and/or the second colour image). The depth prediction map can be continuous or discrete.

Throughout the present disclosure, the term "inter-branch weight sharing mechanism" refers to a configuration where parameters (for example, such as weights, biases, and similar) of layers in different branches of the neural network are shared. This allows the neural network to use same set of weights in both the first branch and the second branch, thereby promoting sharing of learned representations between the first branch and the second branch. In other words, particular layers or parts of the first branch and the second branch have their parameters linked or synchronized. Beneficially, certain similarities or relationships are enforced between the features learned from different inputs. This enables the neural network to make informed depth prediction maps that require integration of information from different inputs.

Optionally, generating the first and second depth prediction maps comprises:

extracting colour-dominant features from the first and second colour images;

extracting depth-dominant features from the sparse depth map;

feeding the first branch with the depth-dominant features and the colour-dominant features associated with the first colour image as the input to generate a first colour-dominant-confidence map used for generating the first depth prediction map; and feeding the second branch with the depth-dominant features and the colour-dominant features associated with the second colour image as the input to generate a second colour-dominant-confidence map used for generating the second depth prediction map.

Herein, the term "colour-dominant features" refers to patterns, textures, and/or information in the first and second colour images that are primarily related to colour. The colour-dominant features are extracted from the first and second colour images by employing techniques such as, colour histograms, colour space transformations, filtering options, and similar, to isolate particular colour characteristics in the first and second colour images. Such techniques are well-known in the art. The term "depth-dominant features" refer to characteristics in the sparse depth map that are indicative of depth variations in the real-world environment. The depth-dominant features are extracted from the sparse depth map by employing techniques such as, edge detection, region segmentation, gradient and derivative analysis, and similar, to capture the depth variations. The depth-dominant features and the colour-dominant features associated with the first colour image and depth-dominant features and the colour-dominant features associated with the second colour image creates the input which is well-prepared. Such input is utilised by the neural network to effectively learn and generalize patterns.

Thereafter, the depth-dominant features and the colour-dominant features associated with the first colour image within the first branch, and the depth-dominant features and the colour-dominant features associated with the second colour image within the second branch, are processed to create the first colour-dominant-confidence map and the second colour-dominant-confidence map, respectively. Herein, a given colour-dominant-confidence map (namely, the first colour-dominant-confidence map and/or the second colour-dominant-confidence map) provides a measure of how confident the neural network is in the colour-dominant features extracted by a given branch (namely, the first branch and/or the second branch) of the neural network. The given colour-dominant-confidence map is used as an additional input for the neural network to consider the colour-dominant features more strongly while generating the given depth prediction map. A technical benefit of generating the given colour-dominant-confidence map is that it enables refining the generating of the given depth prediction map based on confidence values of the neural network in relevance of colour-related features. An exemplary formula for generating the dense depth map for the depth estimation is given by, $$\hat{D}_f(u, v) = \frac{e^{c1(u,v)} \cdot \hat{D}_1(u, v) + e^{c2(u,v)} \cdot \hat{D}_2(u, v)}{e^{c1(u,v)} + e^{c2(u,v)}}$$

wherein (u, v) denotes a pixel, $C_1$(u, v) denotes the first colour-dominant-confidence map, $C_2$(u, v) denotes the second colour-dominant-confidence map, $\hat{D}_1$(u, v) denotes the first depth prediction map, and $\hat{D}_2$(u, v) denotes the second depth prediction map. In this exemplary formula, the dense depth map is generated by determining a ratio of a sum of a first product and a second product, to a sum of an exponential of the first colour-dominant-confidence map and an exponential of the second colour-dominant-confidence map. Herein, the first product is a dot product between the exponential of the first colour-dominant-confidence map with the first depth prediction map, and the second product is a dot product between the exponential of the second colour-dominant-confidence map with the second depth prediction map.

In an embodiment, the inter-branch weight sharing mechanism comprises a cross-attention module that uses cross-view features to share weights between the first and second branches. Herein, the cross-attention module enables the neural network to focus on different parts of the input provided by any of the first branch or the second branch to another of the second branch or the first branch. An example of the cross-attention module may be a bidirectional pyramid attention module (biPAM). The cross-attention module facilitates communication in both forward direction (i.e., from low-level features to high-level features) and in backward direction (i.e., from high-level features to low-level features). In the forward direction, low-level features (for example, from the layers of encoders of the second branch) influence the high-level features (for example, at the layers of decoders of the first branch). In the backward direction, high-level features (for example, from the layers of decoders of the first branch) influence the low-level features (for example, at the layers of encoders of the second branch). The cross-attention module is used to share weights between the first and second branches using cross-view features. Herein, the "cross-view features" are features that are extracted from different branches (i.e., the first and second branches) of the neural network.

In this regard, the cross-attention module uses cross-view features and then determines a similarity score between these cross-view features. Such similarity score provides a measure of similarity of the cross-view features. Subsequently, the cross-view features with a higher similarity score has more influence on the shared weights than the cross-view features with a low-similarity score. The weights are then shared to update current weights of the first and second branches. A technical effect of using cross-view features to share weights between the first and second branches is that this enables the neural network to require less parameters, and the cross-view features is used to refine and improve the depth map finally generated. This facilitates in generating the dense depth map incorporating stereo super-resolution.

Optionally, the first and second colour images and the sparse depth map are fed to a convolution layer C1 to extract the features from the first and second colour images and the sparse depth map. The features are provided as input to four cascaded residual blocks, namely residual block R1, residual block R2, residual block R3, and residual block R4 for further extraction of features. Subsequently, the features that are output from the residual block R4 are provided as input to the cross-attention module. Herein, the input is formed by concatenating the features that are received as output from each residual block R1-4. To achieve cross-view interaction, features received from the residual blocks R1-4 of both the first and second branches as generated by a convolution layer C2, are converted into a suitable form. The weights between the first and second branches are shared and concatenated with the features received. Then, in both the first and second branches, the features are provided as input to a residual block R5. The feature received as output from the residual block R5 is then provided as input to a channel attention layer CA and a convolution layer C3 to fuse all the features to generate an intermediate depth prediction map. This intermediate depth prediction map is then fed to four cascaded residual blocks, namely residual block R6, residual block R7, residual block R8, and residual block R9, a fusion layer C4 and a sub-pixel layer to generate the first depth prediction map and a second depth prediction map.

In another embodiment, the inter-branch weight sharing mechanism comprises merging features between corresponding layers of encoder and decoder of the first and second branches via concatenation or addition. Herein, in both the first and second branches, the skip connections connect layers of encoder and concatenates directly with the corresponding layers of decoder. The extracted colour-dominant features are passed through a rectified linear unit (ReLU) activation function, and then proceeds to the layers of decoder. When the features between the corresponding layers of encoder and decoder of the first and second branches are merged via concatenation, the depth dominant features and the colour-dominant features from the first and second branches of the neural network, are combined by joining them end to end to create a long feature vector. Alternatively, when the features between the corresponding layers of encoder and decoder of the first and second branches are merged via addition, the depth dominant features and the colour-dominant features from the first and second branches of the neural network are summed element-wise to create a combined feature representation. A technical benefit of merging the features between the corresponding layers of encoder and decoder of the first and second branches in such a manner is that this enables the neural network to share the features along with residuals from previous layers. This facilitates in estimating the depth accurately to generate the dense depth map.

Optionally, the method further comprises adjusting weights of the merged features by using an attention module to attenuate features based on loss contribution. The attention module enables the neural network to dynamically adjust an importance of different parts of the input for each of the first and second branches, by adjusting the weights. Herein, the attention module receives inputs from corresponding layers of the encoder and decoder of the first and second branches of the neural network. In other words, the attention module works between each encoder in the layer of encoder of the first branch and each decoder in the layer of decoder of the second branch. The attention module is designed in such a manner only those features (namely, the colour-dominant features and the depth-dominant features) are passed that are relevant for generating the first and second depth prediction maps. Thus, the relevant features are weighed higher than irrelevant features. The attention module applies a 1×1 convolution with a stride of 1 on input received from the layers of decoder, and a 1×1 convolution with a stride of 2 on input received from the layers of encoder. Herein, dimensions of the layers of encoder are resized to dimensions of the layers of decoder, and are added together. Subsequently, it is determined whether the layers of encoder or the layers of decoder produces the relevant feature, wherein such relevant features are information-rich. Such determination is performed by ReLU activation function. In ReLU activation function, aligned weights become larger while unaligned weights become relatively smaller, as the ReLU activation function only passes values that are greater than zero. Subsequently, the features are passed through a convolution layer with a filter. The values of the weights of the features then passes through a sigmoid function, wherein the sigmoid function limits the values within a range of 0 to 1. Subsequently, the layers of encoders and decoders are resized to original dimensions of the input I1, to multiply the weights with the input I1 in an element-wise manner. A technical effect of adjusting the weights of the merged features in such a manner is that it enables learning of shared representations, and reduces a number of parameters of the neural network.

Optionally, the cross-view features and the merged features relate to one of a dynamic region or a gaze region associated with the first and second colour images, and wherein the cross-view features and the merged features are identified by the cross-attention module and the attention module, respectively, for sharing weights between the first and second branches. The dynamic region or the gaze region is determined by mapping gaze directions of a given eye to a gaze-contingent area within a given scene of the real-world environment. Herein, the term "gaze direction" refers to a direction in which the user's eye is gazing. The gaze direction may be represented by a gaze vector. Optionally, at least one of: an image processing algorithm, a feature extraction algorithm, a data processing algorithm is used for processing a gaze-tracking data, collected by a gaze-tracking means. Optionally, the dynamic region is determined based on a change in user's gaze, wherein the dynamic region lies along a direction of a change in the user's gaze. In such a case, the dynamic region could be determined in terms of a gaze velocity and/or a gaze acceleration of the given eye. Alternatively, optionally, the gaze region is mapped using default gaze directions, wherein the default gaze directions is straight towards a centre of a field of view of an image sensor employed in the head-mounted device. In this regard, it is considered that the gaze of the user's eye is, by default, typically directed towards a centre of his/her field of view. In such cases, the dynamic region or the gaze region is resolved to a much greater degree of visual detail, as compared to a remaining, peripheral region of the field of view of the user.

It will be appreciated that one of the dynamic region or the gaze region is selected dynamically, based on the gaze direction. In this regard, the gaze region corresponds to a gaze area (i.e., a region of interest). A technical effect of selecting one of the dynamic region or the gaze region emulates a way in which the user actively focuses within his/her field of view. Determining one of the dynamic region or the gaze region is well-known in the art.

Throughout the present disclosure, the term "dense depth map" refers to a representation of depth information across an entirety of the first and second colour images, providing depth values for a particular portion or all of the pixels in the first and second colour images. Therefore, the dense depth map comprises a detailed and comprehensive representation of depth across a given scene of the real-world environment represented in the first and second colour images. The depth information comprised in the first and second depth prediction maps are integrated or merged, to create the dense depth map which is detailed and covers a larger portion of the given scene. This improves an accuracy and spatial coverage compared to the sparse depth maps.

Optionally, the method further comprises:

generating a third depth prediction map by providing the dense depth map and the sparse depth map as input to a third branch of the neural network, wherein the second and third branches of the neural network share weights by an additional inter-branch weight sharing mechanism; and fusing the third depth prediction map and the dense depth map to generate a modified-dense depth map for the depth estimation.

A technical effect of generating the modified-dense depth map is that it reduces noise around boundaries or edges of the first and second depth prediction maps along with being sensitive to change in colour and texture. Herein, the third branch of the neural network corresponds to depth information. The third branch has an architecture similar to the convolutional architecture of the first and second branches of the neural network. The dense depth map which is used as one of the inputs to the third branch of the neural network comprises the depth information for at least 80 percent of total pixels of the given scene represented in the first and second colour images. The sparse depth map which is used as another one of the inputs to the third branch of the neural network comprises the depth information for particular points or regions. The depth information from both the dense depth map and the sparse depth map are integrated to generate the modified-dense depth map which enhances an overall depth estimation by combining advantages of the dense depth map with refinements provided by the third depth prediction map. A technical benefit of generating the modified-dense depth map is that it enables the neural network to further improve a quality or an accuracy of the dense depth map by incorporating additional refined depth information obtained from the third branch of the neural network.

In this regard, the second and third branches of the neural network share weights through the additional inter-branch weight sharing mechanism, by sharing or synchronizing parameters of particular layers between the second and third branches. The additional inter-branch weight sharing mechanism could be similar to or different from the inter-branch weight sharing mechanism used for sharing weights between the first and second branches of the neural network.

Optionally, generating the third depth prediction map comprises:

extracting depth-dominant features from the dense depth map;

extracting depth-dominant features from the sparse depth; and feeding the third branch with the depth-dominant features associated with the dense depth map and the sparse depth map as the input to generate an additional depth-dominant-confidence map used for generating the third depth prediction map.

The depth-dominant features are extracted by identifying characteristics or patterns within the dense depth map that strongly correlates with the depth information. The depth-dominant features are extracted from the dense depth map by employing techniques such as the edge detection, gradient analysis, texture analysis, and similar. Such techniques are well-known in the art. The extraction of depth-dominant features from the sparse depth maps has been described earlier. Thereafter, the depth-dominant features of the dense depth map and the sparse depth map are processed to generate the additional depth-dominant-confidence map.

Herein, the additional depth-dominant-confidence map provides a measure of how confident and/or reliable the depth-dominant features are in both the dense and the sparse depth maps. A technical benefit of generating the third depth prediction map in such a manner is that it further refines an accuracy of the depth estimation by producing an accurate depth map, by combining information from the first, second, and third branches of the neural network. This enhances an overall depth estimation by considering multiple perspectives.

In an embodiment, the additional inter-branch weight sharing mechanism comprises a cross-attention module that uses cross-view features to share weights between the second and third branches. Herein, the cross-attention module enables the neural network to focus on different parts of the input provided by any of the second branch or the third branch to another of the third branch and/or the second branch. The cross-attention module facilitates communication in a similar manner as described earlier. In the forward direction, low-level features (for example, from the layers of encoders of the third branch) influence the high-level features (for example, at the layers of decoders of the second branch). In the backward direction, high-level features (for example, from the layers of decoders of the second branch) influence the low-level features (for example, at the layers of encoders of the third branch). The cross-attention module is used to share weights between the second and third branches using cross-view features.

In this regard, the cross-attention module uses cross-view features and then determines a similarity score in a similar manner as described earlier. A technical effect of using cross-view features to share weights between the second and third branches is that this enables the neural network to require less parameters, and the cross-view features is used to refine and improve the dense depth map to finally generate an information-rich modified-dense depth map.

In another embodiment, the additional-inter-branch weight sharing mechanism comprises merging features between corresponding layers of encoder and decoder of the second and third branches via concatenation or addition, and wherein weights of the merged features are adjusted by using an attention module to attenuate features based on loss contribution. Herein, in both the second and third branches, the skip connections connect layers of encoder and concatenates directly with the corresponding layers of decoder. The extracted depth-dominant features are passed through a rectified linear unit (ReLU) activation function, and then to the proceeds to the layers of decoder. When the features between the corresponding layers of encoder and decoder of the second and third branches are merged via concatenation, the depth-dominant features from the second and third branches of the neural network are combined by joining them end to end to create a long feature vector. Alternatively, when the features between the corresponding layers of encoder and decoder of the first and second branches are merged via addition, the depth dominant features and the colour-dominant features from the first and second branches of the neural network are summed element-wise to create a combined feature representation. A technical benefit of merging the features between the corresponding layers of encoder and decoder of the second and third branches in such a manner is that this enables the neural network to share the features along with residuals from previous layers. This facilitates in estimating the depth accurately to generate the modified-dense depth map.

Optionally, the attention module enables the neural network to dynamically adjust an importance of different parts of the input for each of the second and third branches, by adjusting the weights. Herein, the attention module receives inputs from corresponding layers of the encoder and decoder of the second and third branches of the neural network. In other words, the attention module works between each encoder in the layer of encoder of the second branch and each decoder in the layer of decoder of the third branch. The attention module is designed in such a manner only those features (namely, the depth-dominant features) are passed that are relevant for generating the first and second depth prediction maps. Thus, the relevant features are weighed higher than irrelevant features. The attention module functions for the second and third branches in a similar manner as described for the first and second branches. A technical effect of adjusting the weights of the merged features in such a manner is that it enables learning of shared representations, and reduces a number of parameters of the neural network.

The present disclosure also relates to the second aspect as described above. Various embodiments and variants disclosed above, with respect to the aforementioned first aspect, apply mutatis mutandis to the second aspect.

Throughout the present disclosure, the term "head-mounted display device" refers to a specialized equipment that is configured to present an extended-reality (XR) environment to the user when the head-mounted display (HMD) apparatus in operation is worn by the user on his/her head. In such an instance, the HMD apparatus acts as a device (for example, such as an XR headset, a pair of XR glasses, and the like) that is operable to present a visual scene of the XR environment to the user. Throughout the present disclosure, the term "extended-reality" encompasses virtual reality (VR), augmented reality (AR), mixed reality (MR), and the like. It will be appreciated that the processor is operatively coupled to the stereo camera. The at least one processor could be implemented as any one of: a microprocessor, a microcontroller, or a controller. As an example, the at least one processor could be implemented as an application-specific integrated circuit (ASIC) chip or a reduced instruction set computer (RISC) chip.

Optionally, the processor is configured to generate the first and second depth prediction maps by:

extracting colour-dominant features from the first and second colour images;

extracting depth-dominant features from the sparse depth map;

feeding the first branch with the depth-dominant features and the colour-dominant features associated with the first colour image as the input to generate a colour-dominant-confidence map used for generating the first depth prediction map; and feeding the second branch with the depth-dominant features and the colour-dominant features associated with the second colour image as the input to generate a depth-dominant-confidence map used for generating the second depth prediction map.

A technical benefit of generating the given colour-dominant-confidence map is that it enables refining the generating of the given depth prediction map based on confidence values of the neural network in relevance of colour-related features.

Optionally, the inter-branch weight sharing mechanism comprises one of:

a cross-attention module that uses cross-view features to share weights between the first and second branches, or merging features between corresponding layers of encoder and decoder of the first and second branches via concatenation or addition, wherein weights of the merged features are adjusted by using an attention module to attenuate features based on loss contribution.

A technical effect of using cross-view features to share weights between the first and second branches is that this enables the neural network to require less parameters, and the cross-view features is used to refine and improve the depth map finally generated. A technical benefit of merging the features between the corresponding layers of encoder and decoder of the first and second branches in such a manner is that this enables the neural network to share the features along with residuals from previous layers. This facilitates in estimating the depth accurately to generate the dense depth map.

Optionally, the processor is further configured to:

generate a third depth prediction map by providing the dense depth map and the sparse depth map as input to a third branch of the neural network, wherein the second and third branches of the neural network share weights by an additional inter-branch weight sharing mechanism, and fuse the third depth prediction map and the dense depth map to generate a modified-dense depth map for the depth estimation.

A technical benefit of generating the third depth prediction map in such a manner is that it further refines an accuracy of the depth estimation by producing an accurate depth map, by combining information from the first, second, and third branches of the neural network. This enhances an overall depth estimation by considering multiple perspectives.

Optionally, the head-mounted display device further comprises a depth sensor for generating the sparse depth map corresponding to the first and second colour images. The processor is optionally operatively coupled with the depth sensor.

A technical effect of using the depth sensor for generating the sparse depth map in such a manner is that it saves processing resources by providing limited depth information. When such sparse depth map is combined with the first and second colour images, they facilitate more accurate and detailed 3D representation of the real-world environment.

DETAILED DESCRIPTION OF THE DRAWINGS

Referring to FIG. 1, illustrated are steps of a method for depth estimation, in accordance with an embodiment of the present disclosure. At step 102, first and second colour images and a sparse depth map corresponding to the first and second colour images are received. At step 104, first and second depth prediction maps are generated by providing the first and second colour images and the sparse depth map as an input to a neural network, wherein the neural network comprises a first branch for receiving the first colour image and the sparse depth map as the input to generate the first depth prediction map and a second branch for receiving the second colour image and the sparse depth map as the input to generate the second depth prediction map, and wherein the first and second branches of the neural network share weights by an inter-branch weight sharing mechanism. At step 106, the first and second depth prediction maps are fused to generate a dense depth map for the depth estimation.

The aforementioned steps are only illustrative and other alternatives can also be provided where one or more steps are added, one or more steps are removed, or one or more steps are provided in a different sequence without departing from the scope of the claims herein.

Figure 2:
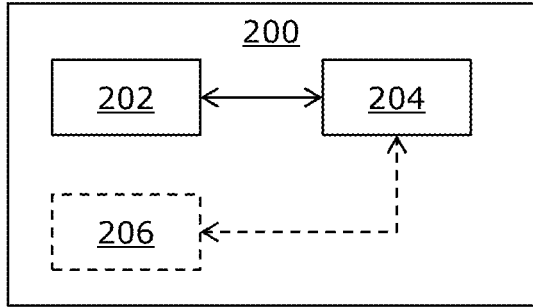
FIG. 2, there is shown a schematic illustration of an architecture of a head-mounted display device, in accordance with an embodiment of the present disclosure.

Referring to FIG. 2, there is shown a schematic illustration of an architecture of a head-mounted display device 200, in accordance with an embodiment of the present disclosure. The head-mounted display device 200 comprises a stereo camera 202 and a processor 204 operatively coupled to the stereo camera 202. The stereo camera 202 captures first and second colour images. The processor 204 is configured to perform various operations, as described earlier with respect to the aforementioned second aspect. Optionally, the head-mounted display device 200 further comprises a depth sensor 206 for generating a sparse depth map corresponding to the first and second colour images. The processor 204 is operatively coupled with the depth sensor 206.

It may be understood by a person skilled in the art that FIG. 2 includes a simplified architecture of the head-mounted display device 200, for sake of clarity, which should not unduly limit the scope of the claims herein. It is to be understood that the specific implementation of the head-mounted display device 200 is provided as an example and is not to be construed as limiting it to specific numbers or types of stereo cameras, and processors. The person skilled in the art will recognize many variations, alternatives, and modifications of embodiments of the present disclosure.

Figure 3A:
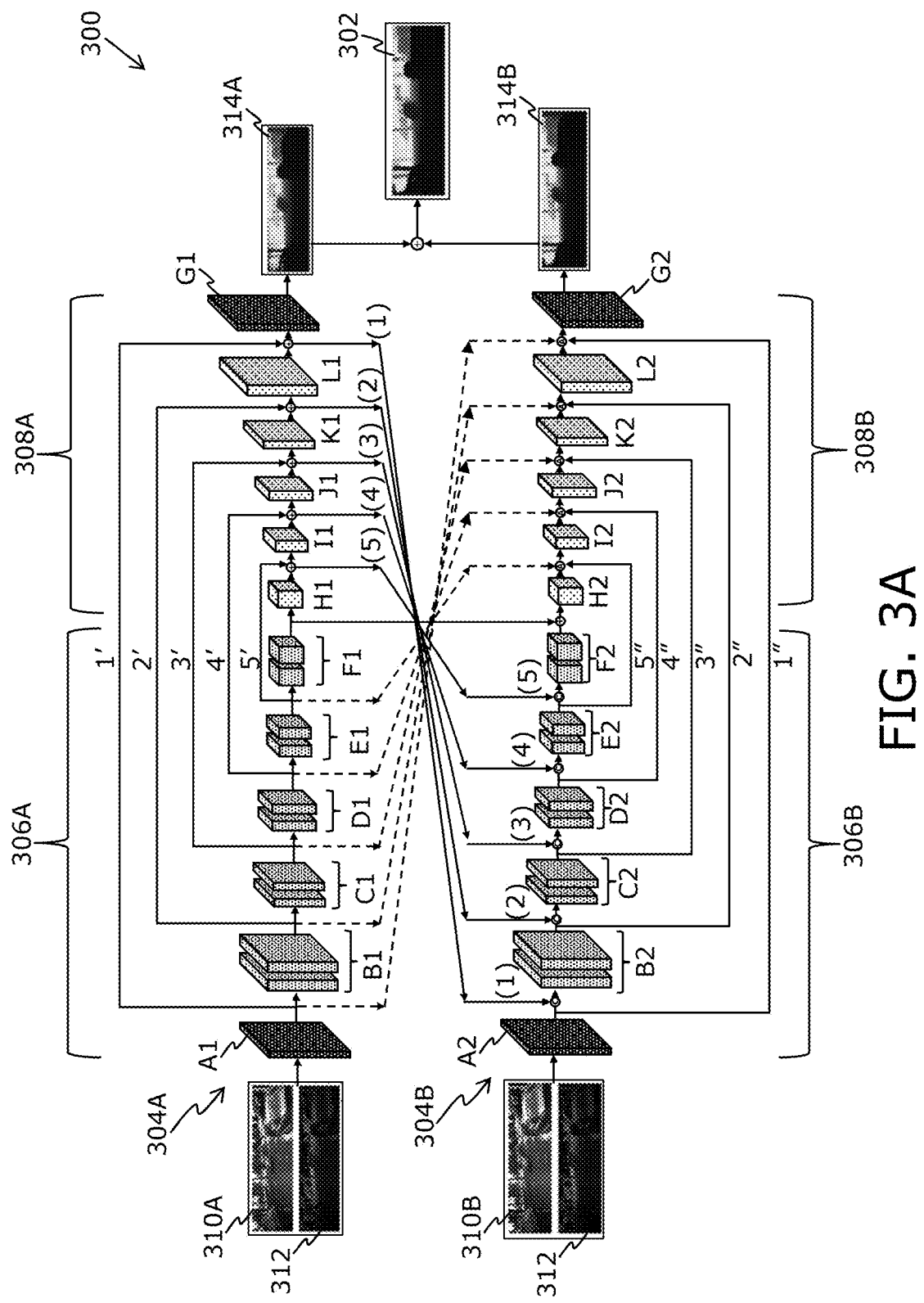
FIG. 3A, illustrates a block representation of an exemplary neural network that is used for generating a dense depth map, in accordance with an embodiment of the present disclosure.

Referring to FIG. 3A, there is illustrated a block representation 300 of an exemplary neural network that is used for generating a dense depth map 302, in accordance with an embodiment of the present disclosure. The neural network comprises a first branch 304A and a second branch 304B, wherein both the first branch 304A and the second branch 304B has a convolutional architecture (for example, such as an UNet architecture). Furthermore, the first branch 304A comprises a layer 306A of encoder and a layer 308A of decoder. Similarly, the second branch 304B comprises a layer 306B of encoder and a layer 308B of decoder. The layer 306A of encoder of the first branch 304A comprises a convolutional layer A1 and five pairs of two residual blocks (ResBlocks) (depicted as pairs B1, C1, D1, E1, F1 of ResBlocks) (i.e., a total of 10 ResBlocks). Similarly, the layer 306B of encoder of the second branch 304B comprises a convolutional layer A2 and five pairs of two residual blocks (ResBlocks) (depicted as pairs B2, C2, D2, E2, F2 of ResBlocks) (i.e., a total of 10 ResBlocks). The layer 308A of decoder of the first branch 304A comprises a convolutional layer G1 and five ResBlocks H1, I1, J1, K1, L1. Similarly, the layer 308B of decoder of the second branch 304B comprises a convolutional layer G2 and five ResBlocks H2, I2, J2, K2, L2. The first branch 304A and the second branch 304B of the neural network share weights by an inter-branch weight sharing mechanism, as shown by arrow-headed lines 1, 2, 3, 4, and 5. The inter-branch weight sharing mechanism comprises merging features between the layers 306A-B of encoder and the layers 308A-B of decoder of the first and second branches 304A-B via concatenation or addition (as shown by skip connections 1', 2', 3', 4' and 5' for the first branch 304A and skip connections 1", 2", 3", 4" and 5" for the second branch 304B).

Herein, the neural network receives as an input a first colour image 310A, a second colour image 310B, and a sparse depth map 312 corresponding to the first colour image 310A and the second colour image 310B. In this regard, the first branch 304A of the neural network receives the first colour image 310A and the sparse depth map 312 as the input to generate a first depth prediction map 314A. The second branch 304B of the neural network receives the second colour image 310B and the sparse depth map 312 as the input to generate a second depth prediction map 314B. The first depth prediction map 314A and the second depth prediction map 314B are then fused to generate the dense depth map 302 for depth estimation.

Optionally, the exemplary neural network further comprises an attention model A to attenuate features based on loss contribution. Herein, the attention module A is employed to merge features (as shown by dashed arrowhead lines) between each encoder in the layer of encoder of the first branch and each decoder in the layer of decoder of the second branch.

Figure 3B:
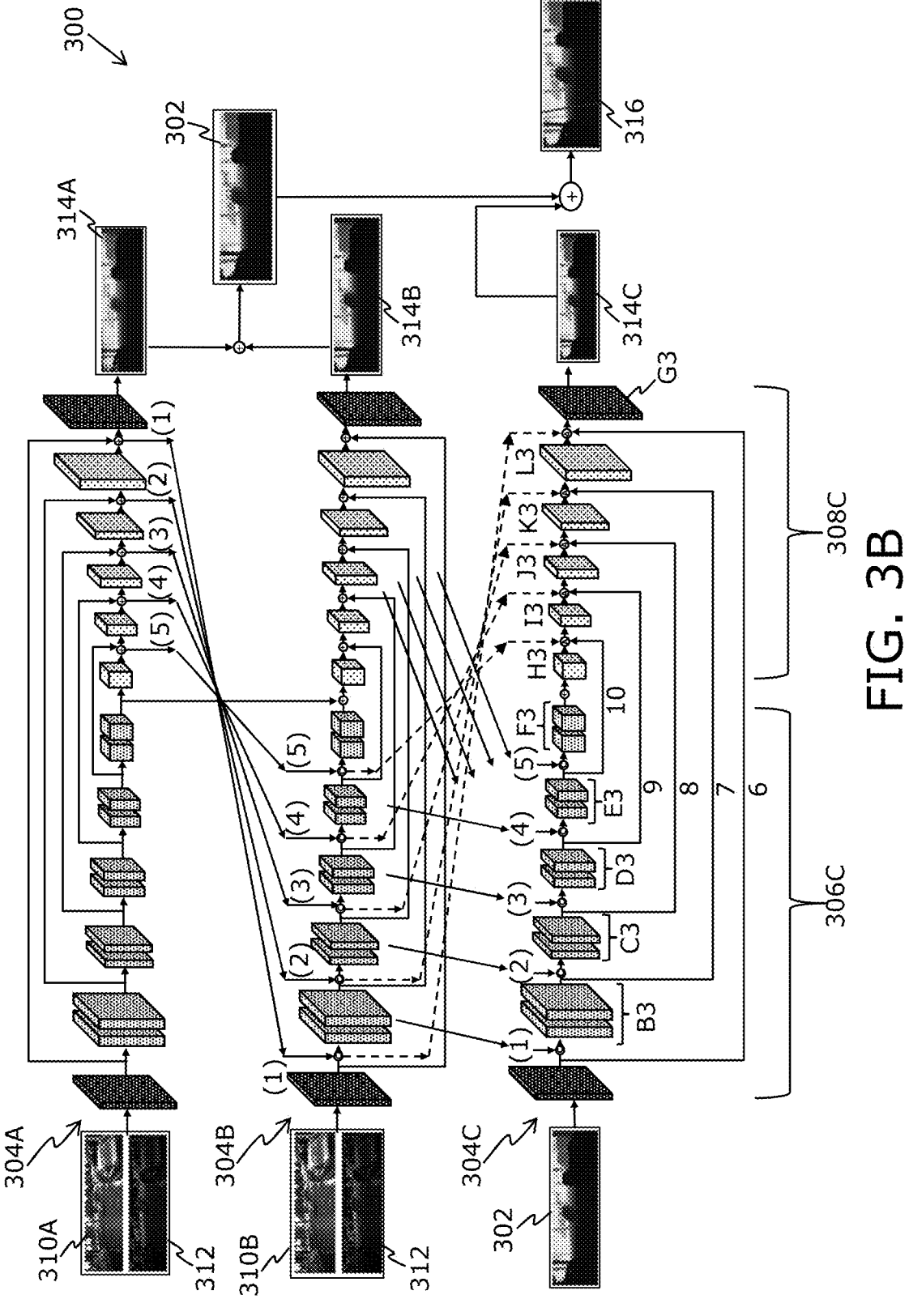
FIG. 3B illustrates the block representation of an exemplary neural network that is used for generating a modified-dense depth map, in accordance with another embodiment of the present disclosure.

Referring to FIG. 3B, there is illustrated the block representation 300 of an exemplary neural network that is used for generating a modified-dense depth map 316, in accordance with another embodiment of the present disclosure. Some elements of FIG. 3B have not been marked for sake of convenience and brevity, as such elements (layers 306A-B of encoder, layers 308A-B of decoder, convolutional layer A1-4, five pairs of two residual blocks B1-2, C1-2, D1-2, E1-2, F1-2, five ResBlocks H1-2, I1-2, J1-2, K1-2, L1-2, inter-branch weight sharing mechanism as shown by arrow-headed lines 1, 2, 3, 4, and 5, skip connections 1', 2', 3', 4' for the first branch 304A and skip connections 1", 2", 3", 4" and 5" for the second branch 304B) have already been marked in FIG. 3A. The neural network further comprises a third branch 304C which has the convolutional architecture, similar to that of the first branch 304A and the second branch 304B. Furthermore, the third branch 304C comprises a layer 306C of encoder and a layer 308C of decoder. The layer 306C of encoder of the third branch 304C comprises a convolutional layer A5 and five pairs of two residual blocks (ResBlocks) (depicted as pairs B3, C3, D3, E3, F3 of ResBlocks) (i.e., a total of 10 ResBlocks). The layer 308C of decoder of the third branch 304C comprises a convolutional layer G3 and five ResBlocks H3, I3, J3, K3, L3. The second branch 304B and the third branch 304C of the neural network share weights by an additional inter-branch weight sharing mechanism as shown by arrow-headed lines 6, 7, 8, 9, and 10. The additional inter-branch weight sharing mechanism comprises merging features between corresponding layers 306B-C of encoder and layers 308B-C of decoder of the second and third branches 304B-C via concatenation or addition (as shown by skip connections 6', 7', 8', 9' and 10' for the third branch 304C.

Herein, the neural network receives as input the dense depth map 302 and the sparse depth map 312 to the third branch 304C to generate a third depth prediction map 314C. The third depth prediction map 314C and the dense depth map 302 are then fused to generate the modified-dense depth map 316 for the depth estimation.

Optionally, the exemplary neural network further comprises an attention model A to attenuate features based on loss contribution. Herein, the attention module A is employed to merge features (as shown by dashed arrowhead lines) between each encoder in the layer of encoder of the second branch and each decoder in the layer of decoder of the third branch.

FIGS. 3A-B are merely examples, which should not unduly limit the scope of the claims herein. A person skilled in the art will recognize many variations, alternatives, and modifications of embodiments of the present disclosure. For example, the neural network may have a different number of blocks and/or a different arrangement of the blocks, the different blocks of the neural network may have various dimensions, different skip connections, and similar.

Figure 4:
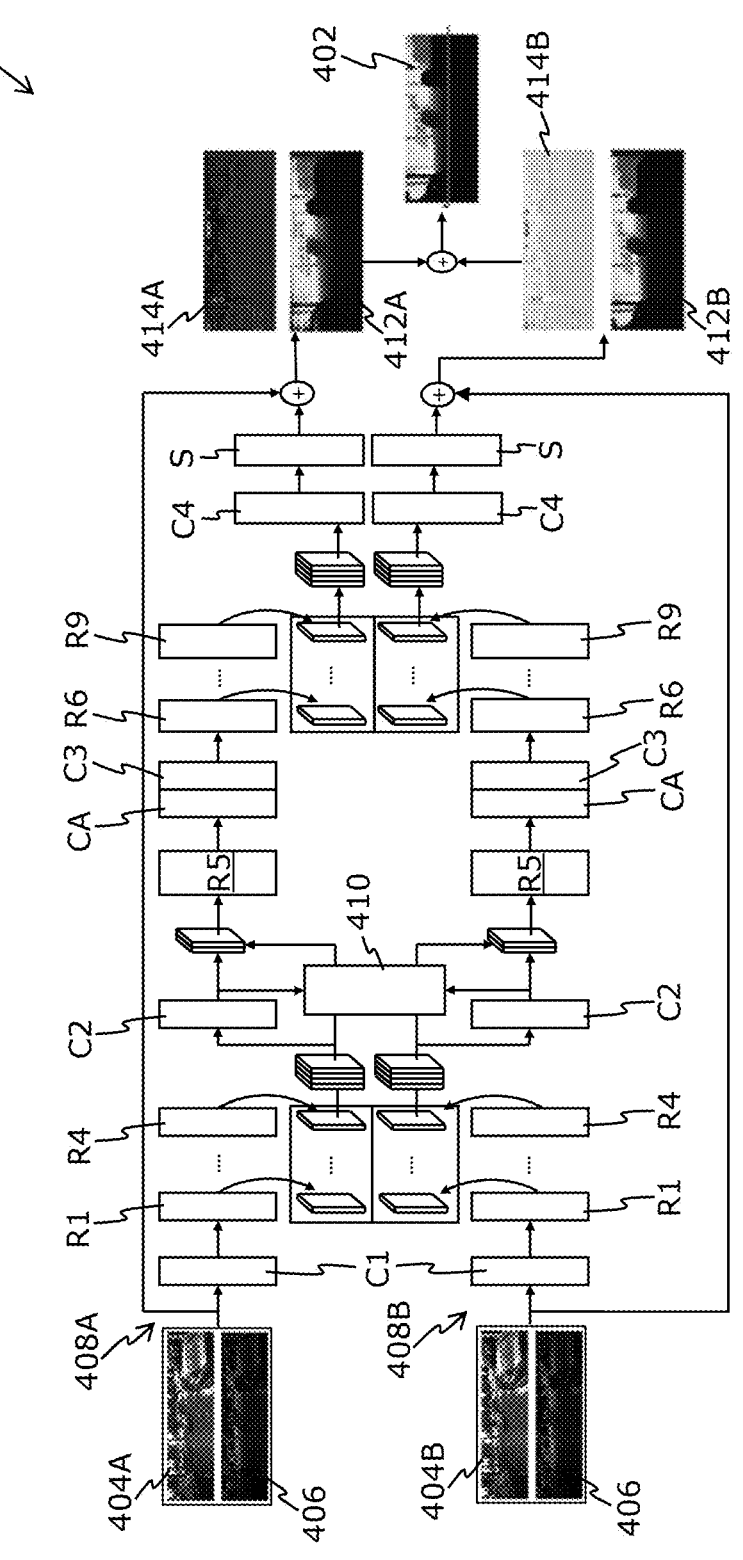
FIG. 4 illustrates a detailed block representation of a neural network that is used for generating a dense depth map, in accordance with an embodiment of the present disclosure.

Referring to FIG. 4, there is illustrated a detailed block representation 400 of a neural network that is used for generating a dense depth map 402, in accordance with an embodiment of the present disclosure. The neural network is used to sequentially perform extraction of features (namely, colour-dominant features and depth-dominant features) (namely, feature extraction) from first colour image 404A and second colour image 404B and a sparse depth map 406 corresponding to the first and second colour images 404A-B, cross-view interaction between a first branch 408A and second branch 408B of a neural network, and reconstruction. The first and second colour images 404A-B and the sparse depth map 406 are fed to a convolution layer (depicted as C1) to extract the features from the first and second colour images 402A-B and the sparse depth map 404. The features are provided as input to four cascaded residual blocks R1, R2, R3, and R4 for further extraction of features. Subsequently, the features that are output from the residual block R4 are provided as input to a cross-attention module 410. Herein, the input is formed by concatenating the features that are received as output from each residual block R1-4. To achieve cross-view interaction, features received from the residual blocks R1-4 of both the first and second branches 408A-B as generated by a convolution layer C2, are converted into a suitable form. The weights between the first and second branches 408A-B are shared and concatenated with the features received. Then, in both the first and second branches 408A-B, the features are provided as input to a residual block R5. The feature received as output from the residual block R5 is then provided as input to a channel attention layer CA and a convolution layer C3 to fuse all the features to generate an intermediate depth prediction map. This intermediate depth prediction map is then fed to four residual blocks R6, R7, R8, and R9, a fusion layer C4 and a sub-pixel layer S to generate a first depth prediction map 412A and a second depth prediction map 412B. Furthermore, when the first branch 408A is fed with the depth-dominant features and the colour-dominant features associated with the first colour image 402A as the input to generate a first colour-dominant-confidence map 414A used for generating the first depth prediction map 412A. When the second branch 412B is fed with the depth-dominant features and the colour-dominant features associated with the second colour image 402B as the input to generate a second colour-dominant-confidence map 414B used for generating the second depth prediction map 412B. The first and second depth prediction maps 412A-B are then fused to generate a dense depth map 402 for the depth estimation.

FIG. 4 is merely an example, which should not unduly limit the scope of the claims herein. A person skilled in the art will recognize many variations, alternatives, and modifications of embodiments of the present disclosure. For example, the neural network may have a different number of blocks and/or a different arrangement of the blocks, the different blocks of the neural network may have various dimensions, different skip connections, and similar.

Figure 5:
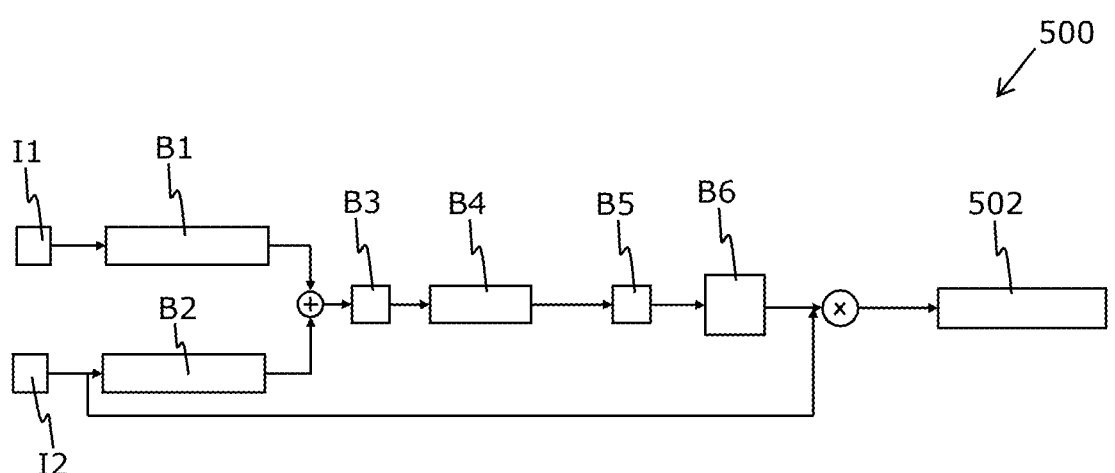
FIG. 5 illustrates an detailed block representation of an attention module to attenuate features, in accordance with an embodiment of the present disclosure.

Referring to FIG. 5, there are illustrated a detailed block representation 500 of an attention module to attenuate features, in accordance with an embodiment of the present disclosure. The attention module receives input I1 from layers of encoder and an input I2 from layers of decoder of a first and second branches of a neural network. The attention module is designed in such a manner that only those features (namely, colour-dominant features and depth-dominant features) are passed that are relevant to an output (namely, the first and second depth prediction maps). Thus, the relevant features are weighed higher than irrelevant features. The attention module applies a 1×1 convolution with a stride of 1 on input I2 when it passes through a block B1, and applies a 1×1 convolution with a stride of 2 on input I1 when it passes through a block B2. Herein, dimensions of the layers of encoder are resized to dimensions of the layers of decoder, and are added together. Subsequently, it is determined whether the layers of encoder or the layers of decoder produces the relevant feature, wherein such relevant features are information-rich. Such determination is performed by a Rectified Linear Unit (ReLU) activation function (depicted as a block B3). In ReLU activation function, aligned weights become larger while unaligned weights become relatively smaller, as the ReLU activation function only passes values that are greater than zero. Subsequently, the features are passed through a convolution layer B4 with a filter. The values of the weights of the features then passes through sigmoid function (depicted as block B5), wherein the sigmoid function limits the values within a range of 0 to 1. The features are then passes through an up-sampling block B6. Subsequently, the layers of encoders and decoders are resized to original dimensions of the input I1, to multiply the weights with the input I1 in an element-wise manner. Finally, a depth prediction map 502 is generated.

FIG. 5 is merely an example, which should not unduly limit the scope of the claims herein. A person skilled in the art will recognize many variations, alternatives, and modifications of embodiments of the present disclosure. For example, the neural network may have a different number of blocks and/or a different arrangement of the blocks, the different blocks of the neural network may have various dimensions, different skip connections, and similar.

The invention claimed is:

1. A method for depth estimation, the method comprising:
receiving first and second colour images and a sparse depth map corresponding to the first and second colour images;
generating first and second depth prediction maps by providing the first and second colour images and the sparse depth map as an input to a neural network, wherein the neural network comprises a first branch for receiving the first colour image and the sparse depth map as the input to generate the first depth prediction map and a second branch for receiving the second colour image and the sparse depth map as the input to generate the second depth prediction map, and wherein the first and second branches of the neural network share weights by an inter-branch weight sharing mechanism;
fusing the first and second depth prediction maps to generate a dense depth map for the depth estimation;
generating a third depth prediction map by providing the dense depth map and the sparse depth map as input to a third branch of the neural network, wherein the second and third branches of the neural network share weights by an additional inter-branch weight sharing mechanism; and
fusing the third depth prediction map and the dense depth map to generate a modified-dense depth map for the depth estimation.

2. The method according to claim 1, wherein generating the first and second depth prediction maps comprises:
extracting colour-dominant features from the first and second colour images;
extracting depth-dominant features from the sparse depth map;
feeding the first branch with the depth-dominant features and the colour-dominant features associated with the first colour image as the input to generate a first colour-dominant-confidence map used for generating the first depth prediction map; and
feeding the second branch with the depth-dominant features and the colour-dominant features associated with the second colour image as the input to generate a second colour-dominant-confidence map used for generating the second depth prediction map.

3. The method according to claim 1, wherein the inter-branch weight sharing mechanism comprises a cross-attention module that uses cross-view features to share weights between the first and second branches.

4. The method according to the claim 1, wherein the inter-branch weight sharing mechanism comprises merging features between corresponding layers of encoder and decoder of the first and second branches via concatenation or addition.

5. The method according to claim 4, further comprising adjusting weights of the merged features by using an attention module to attenuate features based on loss contribution.

6. The method according to the claim 3, wherein the cross-view features and the merged features relate to one of a dynamic region or a gaze region associated with the first and second colour images, and wherein the cross-view features and the merged features are identified by the cross-attention module and the attention module, respectively, for sharing weights between the first and second branches.

7. The method according to claim 1, wherein generating the third depth prediction map comprises:
extracting depth-dominant features from the dense depth map;
extracting depth-dominant features from the sparse depth map; and
feeding the third branch with the depth-dominant features associated with the dense depth map and the sparse depth map as the input to generate an additional depth-dominant-confidence map used for generating the third depth prediction map.

8. The method according to claim 7, wherein the additional inter-branch weight sharing mechanism comprises a cross-attention module that uses cross-view features to share weights between the second and third branches.

9. The method according to claim 7, wherein the additional-inter-branch weight sharing mechanism comprises merging features between corresponding layers of encoder and decoder of the second and third branches via concatenation or addition, and wherein weights of the merged features are adjusted by using an attention module to attenuate features based on loss contribution.

10. A head-mounted display device comprising:
a stereo camera for capturing first and second colour images; and
a processor operatively coupled to the stereo camera, wherein the processor is configured to
receive the first and second colour images;
generate a sparse depth map corresponding to the first and second colour images;
generate first and second depth prediction maps by providing the first and second colour images and the sparse depth map as an input to a neural network, wherein the neural network comprises a first branch for receiving the first colour image and the sparse depth map as the input to generate the first depth prediction map and a second branch for receiving the second colour image and the sparse depth map as the input to generate the second depth prediction map, and wherein the first and second branches of the neural network share weights by an inter-branch weight sharing mechanism;

fuse the first and second depth prediction maps to generate a dense depth map for the depth estimation;

generate a third depth prediction map by providing the dense depth map and the sparse depth map as input to a third branch of the neural network, wherein the second and third branches of the neural network share weights by an additional inter-branch weight sharing mechanism, and fuse the third depth prediction map and the dense depth map to generate a modified-dense depth map for the depth estimation.

11. The head-mounted display device according to claim 10, wherein the processor is configured to generate the first and second depth prediction maps by:

extracting colour-dominant features from the first and second colour images;

extracting depth-dominant features from the sparse depth map;

feeding the first branch with the depth-dominant features and the colour-dominant features associated with the first colour image as the input to generate a colour-dominant-confidence map used for generating the first depth prediction map; and feeding the second branch with the depth-dominant features and the colour-dominant features associated with the second colour image as the input to generate a depth-dominant-confidence map used for generating the second depth prediction map.

12. The head-mounted display device according to the claim 10, wherein the inter-branch weight sharing mechanism comprises one of:

a cross-attention module that uses cross-view features to share weights between the first and second branches, or merging features between corresponding layers of encoder and decoder of the first and second branches via concatenation or addition, wherein weights of the merged features are adjusted by using an attention module to attenuate features based on loss contribution.

13. A head-mounted display device according to the claim 10, further comprising a depth sensor for generating the sparse depth map corresponding to the first and second colour images.

\* \* \* \* \*